US012607536B2

(12) United States Patent
Tunks et al.

(10) Patent No.: US 12,607,536 B2
(45) Date of Patent: Apr. 21, 2026

(54) BUSBAR-ATTACHED LEAK DETECTION BAR

(71) Applicant: Dell Products L.P., Round Rock, TX (US)

(72) Inventors: Eric Michael Tunks, Austin, TX (US); Sandor Farkas, Round Rock, TX (US); Ben John Sy, Austin, TX (US); Michael J. Stumpf, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 18/423,489

(22) Filed: Jan. 26, 2024

(65) Prior Publication Data

US 2025/0244193 A1 Jul. 31, 2025

(51) Int. Cl.
*G01M 3/04* (2006.01)
*G01M 3/20* (2006.01)

(52) U.S. Cl.
CPC ................ *G01M 3/04* (2013.01); *G01M 3/20* (2013.01)

(58) Field of Classification Search
CPC ... G01M 3/04; G01M 3/20; G01M 3/221–229
See application file for complete search history.

(56) References Cited

U.S. PATENT DOCUMENTS

| | | | |
|---|---|---|---|
| 2021/0116391 A1* | 4/2021 | Subrahmanyam | ........................... H05K 7/20327 |
| 2022/0196507 A1* | 6/2022 | Subrahmanyam ... | H05K 7/2079 |
| 2022/0291072 A1* | 9/2022 | Stumpf .............. | H05K 7/20272 |
| 2022/0408596 A1* | 12/2022 | Gao ................... | H05K 7/20281 |

* cited by examiner

*Primary Examiner* — Nathaniel J Kolb
(74) *Attorney, Agent, or Firm* — Fogarty LLP

(57) ABSTRACT

Systems are provided for liquid cooling of an IHS (Information Handling System) installed in a computing rack that includes a liquid cooling manifold. A liquid cooling coupling connects the IHS to the liquid cooling manifold. A busbar of the rack is coupled to the IHS and provides power to the IHS. A leak detection bar is attached to the busbar and includes leak detection sensors that are directed at the liquid cooling coupling connecting the IHS to the liquid cooling manifold.

18 Claims, 5 Drawing Sheets

BUSBAR-ATTACHED LEAK DETECTION BAR

FIELD

This disclosure relates generally to Information Handling Systems (IHSs), and, more specifically, to supporting liquid cooling of IHSs.

BACKGROUND

An Information Handling System (IHS) generally processes, compiles, stores, and/or communicates information or data for business, personal, or other purposes. IHSs may include a variety of hardware and software components that are configured to process, store, and communicate information and may include one or more computer systems, data storage systems, and networking systems. Groups of IHSs may be housed within data center environments. A data center may include a large number of IHSs, such as server chassis that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing any downtime.

As IHS hardware components, such as processors and memory, have increased in speed and power consumption, the amount of heat produced by such components during operation of an IHS has also increased. Often, the temperatures of IHS hardware components must be kept within a well-defined range in order to prevent overheating, instability, malfunction, and/or damage that would lead to a shortened component lifespan and lowered datacenter reliability. Accordingly, cooling systems are used in IHSs in order to remove heat that is generated by hardware components. In passive airflow cooling systems, cooling fans are used to force heated air away from a hardware component, and to ventilate heated air away from cooling fins or other heat dissipating structures of the component. In an active, liquid cooling system, a heat-exchanging cold plate is thermally coupled to an IHS component that is to be cooled, and a chilled fluid is passed through conduits internal to the cold plate in order to remove heat from that component. The heated liquid is then cooled and recirculated.

SUMMARY

In various embodiments, systems are provided for liquid cooling of an IHS (Information Handling System) installed in a computing rack. The systems may include: a first liquid cooling manifold; a first liquid cooling coupling connecting the IHS to the first liquid cooling manifold; a busbar coupled to the IHS, wherein the busbar provides power to the IHS; and a first leak detection bar attached to the busbar and comprising a plurality of leak detection sensors directed at the first liquid cooling coupling connecting the IHS to the first liquid cooling manifold.

In some system embodiments, the busbar extends along a height of the computing rack and provides power to additional IHSs installed in the computing rack. In some system embodiments, the first liquid cooling manifold comprises an intake manifold that extends along the height of the computing rack. Some system embodiments include a second liquid cooling manifold comprises an exhaust manifold that extends along the height of the computing rack. Some system embodiments include a second leak detection bar attached to the busbar and comprising a plurality of leak detection sensors directed at a second liquid cooling coupling connecting the IHS to the second liquid cooling manifold. In some system embodiments, the first leak detection bar comprises a shade that blocks ambient light from reaching the plurality of leak detection sensors. In some system embodiments, the plurality of leak detection sensors comprise optical leak sensors. In some system embodiments, the first leak detection bar is attached to the busbar via one or more hinges that allow rotation of the first leak detection bar. In some system embodiments, rotation of the first leak detection bar using the hinges redirects the plurality of leak detection sensors to a rear portion of the IHS. In some system embodiments, rotation of the first leak detection bar redirects the plurality of leak detection sensors to a third liquid cooling coupling connecting a second IHS to the first liquid cooling manifold. In some system embodiments, the second IHS is smaller than the first IHS such that the third liquid cooling coupling extends further from the first liquid cooling manifold than the first liquid cooling coupling of the first IHS. In some system embodiments, the one or more hinges comprise detents corresponding to predefined angles of rotation of the hinges. In some system embodiments, the first leak detection bar comprises a plurality of lights indicating a leak detected by one or more of the leak detection sensors.

In various additional embodiments, computing racks are provided, each including a plurality of slots for installation of Information Handling Systems (IHSs). Rack embodiments may include: a first liquid cooling manifold extending a height of the rack; a busbar extending the height of the rack, wherein the busbar provides power to the IHS installed in the rack; and a first leak detection bar attached to the busbar and comprising a plurality of leak detection sensors directed at liquid cooling couplings connecting the IHS to the first liquid cooling manifold.

In some rack embodiments, the first leak detection bar comprises a shade that blocks ambient light from reaching the plurality of leak detection sensors. In some rack embodiments, the plurality of leak detection sensors comprise optical leak sensors. In some rack embodiments, the first leak detection bar is attached to the busbar via one or more hinges that allow rotation of the first leak detection bar.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
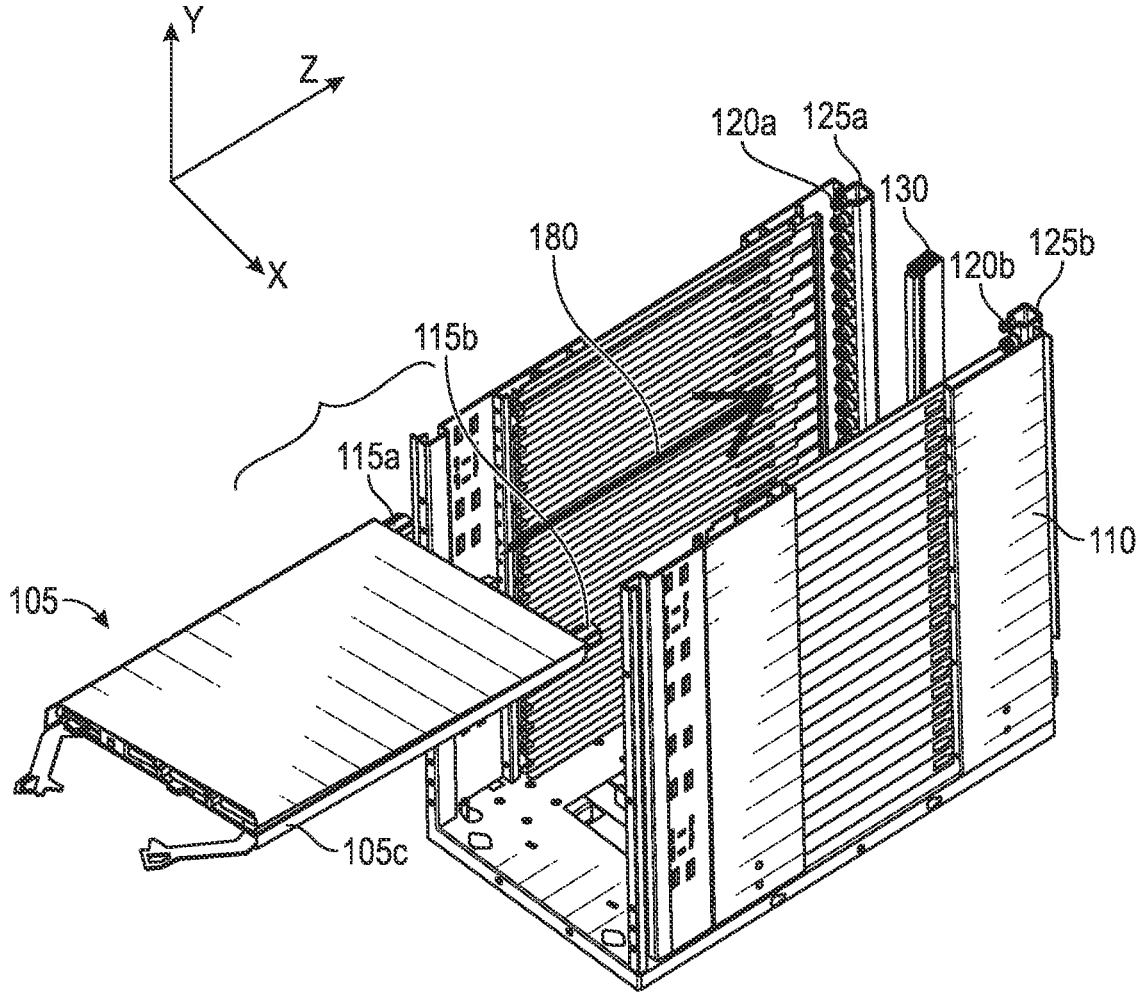
FIG. 1 is an illustration of a server IHS being inserted into a slot of rack in order to couple the server to a busbar and liquid cooling manifolds supported by the rack.

FIG. 1 is an illustration of a server IHS 105 being inserted into a slot of computing rack 110, where the server may share resources provided by the rack, such as shared cooling and power provided by the rack. Accordingly, the insertion of server IHS 105 into a slot of rack 110 couples the server IHS to liquid cooling manifolds 125*a-b* provided by the rack. In a data center environment, a server IHS 105 may be installed within a rack 110 along with other similar IHSs, such as other server IHSs that are likewise installed in one or more slots of rack 100, where some or all of these server IHSs may be similarly coupled to liquid cooling manifolds 125*a-b* provided by the rack 110. A rack 110 includes multiple slots in which a server IHS 105 can be physically inserted by an administrator, where the server is instead by force applied by an administrator in the direction 180 illustrated in FIG. 1. At various occasions, administration of a sever IHS 105 may require removal of the server from the rack 110, in which case an administrator uses the illustrated handles to pull the server from its slot in the rack 110.

When installing server IHS 105 within rack 110, the force applied in direction 180 by the administrator inserts the server into a slot of the rack and also couples the server to shared infrastructure resources of the IHS. For instance, the force applied in direction 180 couples the server IHS 105 to a busbar 130 that provides the server with a supply of power, where the busbar 130 provides a shared power supply used by some or all of the hardware installed in rack 110. In addition, the force applied by the administrator in direction 180 couples the server IHS 105 to liquid cooling manifolds 125*a-b* provided by the rack. Rack 110 includes an inlet coolant manifold for distributing cooled liquid received from a recirculation system to server IHS 105 and an outlet coolant manifold for receiving heated liquid from server IHS 105. In the illustrated embodiments, the liquid cooling manifolds 125*a-b* may arranged with either of the manifolds as the inlet manifold and the other as the outlet manifold, with this arrangement selected to correspond to arrangement of liquid cooling couplings 115*a-b* of the server IHS 105 and of the other server IHSs or other hardware using the shared liquid cooling resources supported by rack 110. The use of liquid cooling manifolds 125*a-b* enables the cooling of multiple servers and/or other hardware using a single cooling source (e.g., a liquid recirculation system).

Through the force applied by the administrator in direction 180, liquid cooling couplings 115*a-b* of the server IHS 105 are connected to corresponding couplings 120*a-b* of each of the liquid cooling manifolds 125*a-b*. Once coupled, the liquid cooling couplings 115*a-b* allow coolant to flow to and from the internal cooling lines of the server IHS 105, in particular the intake and exhaust liquid coolant lines 105*a-b* of the server. In some embodiments, the liquid cooling couplings 115*a-b* of the server IHS 105 and the couplings 120*a-b* of the liquid cooling manifolds 125*a-b* may be quick-connect couplings that can be connected without use of tools and solely via the force applied by the administrator in direction 180. Through the use of such quick-connect couplings, the coupling of server IHS 105 to the liquid cooling manifolds 125*a-b* may thus be completed blindly by the administrator that is inserting the server into a slot in the rack 110, and thus with the administrator unable to view the liquid cooling couplings 115*a-b* that are being connected.

Since such couplings must be completely blindly, the administrator is unable to visually confirm that the couplings have fully seated without any coolant leaks. The administrator may view the couplings 115*a-b*, 120*a-b* from the rear of the rack 110, but such visibility may be limited, especially in scenarios where the slots of rack 110 are full of operating hardware. Moreover, even when the couplings 115*a-b*, 120*a-b* are visible, the administrator may nonetheless have limited ability to confirm the couplings have been seated properly and to conform that minor leaks are not present at these connection. As described in additional detail below, embodiments support leak detection at this interface between the couplings 115*a-b*, 120*a-b* of the first liquid cooling manifolds 125*a-b* and of the server IHS 105, or other liquid-cooled hardware that is installed in the rack 110.

Figure 2:
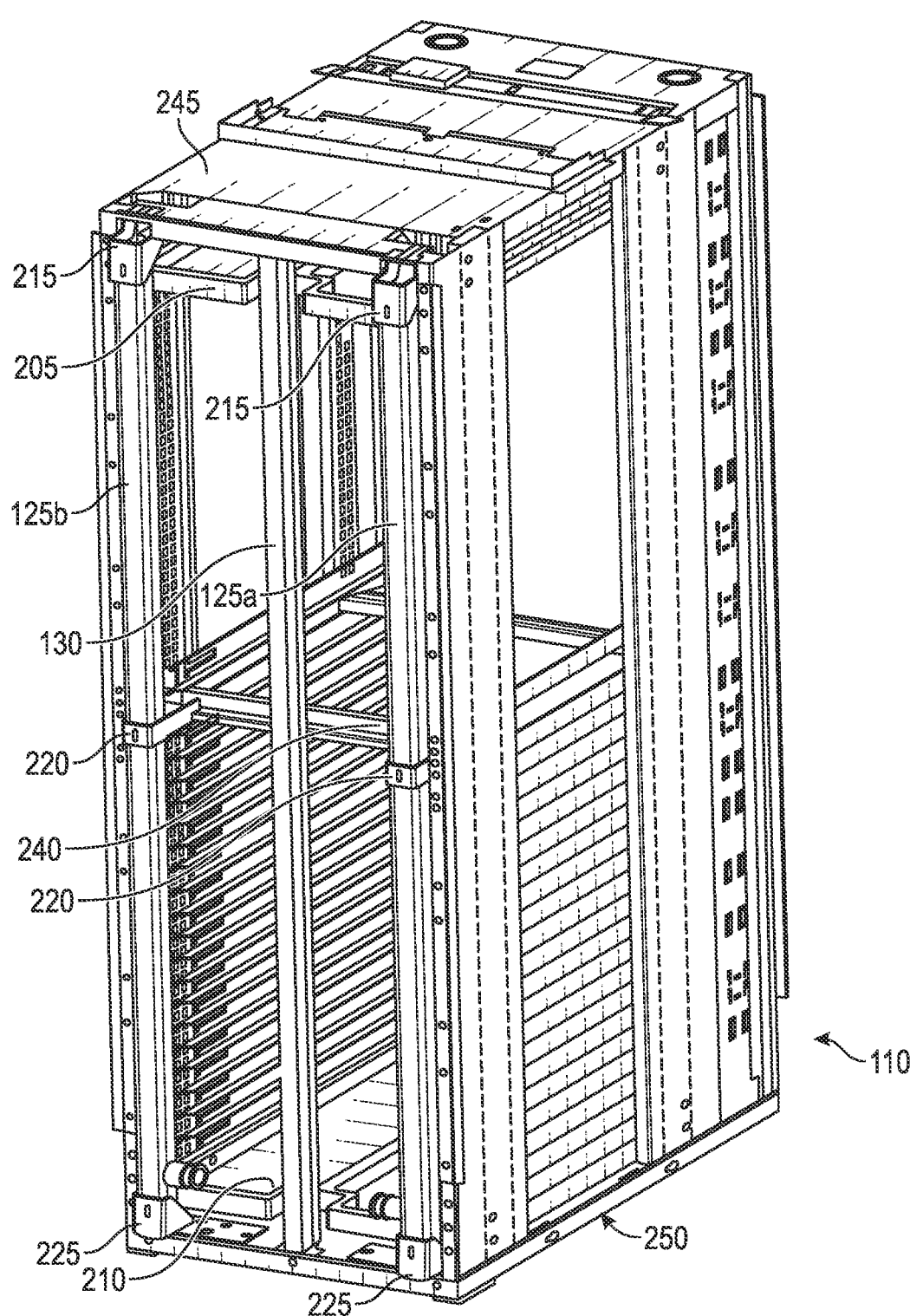
FIG. 2 is an illustration of a rack that includes liquid cooling manifolds and a busbar, according to embodiments.

FIG. 2 is an illustration of a rack that includes liquid cooling manifolds 125*a-b* and a busbar 130. In particular, FIG. 2 illustrates a rear-facing view of a partially assembled rack 110. In some instances, rack 110 includes a frame structure, that may include side panels with rails, brackets, guides or other precisely located structures for receiving corresponding structures of a server IHS 105, or other hardware that is installed in one or more slots that are supported of the rack 110. The frame structure may include a base 250 and a top cover 245 that may be connected via any number of vertical panels, braces, posts, supports, etc. For instance, the frame structure of the rack 110 may include one or more precisely located cross braces 240 that provide lateral stability, and in many instances may be located approximately midway along the vertical height of the rack 110.

In the rear-facing view of FIG. 2, the length of busbar 130 is visible as it extends the vertical height of the rack 110, from the base 150 to the top cover 145 in providing a shared supply of power for the hardware components that are installed in the rack. Also visible in FIG. 2 is the full length of the liquid cooling manifolds 125*a-b* that also extend the vertical height of the rack 110. In some embodiments, the liquid cooling manifolds 125*a-b* are attached to the rack 110 via brackets. The busbar may include a clip or connector to which the server IHS 100 may be coupled in order to connect the server to the supply of power that is available via the busbar 130. The busbar 130 may be include an outer frame that is attached to the rack 110, with the power delivery cables and components of the busbar within this frame.

Figure 3A:
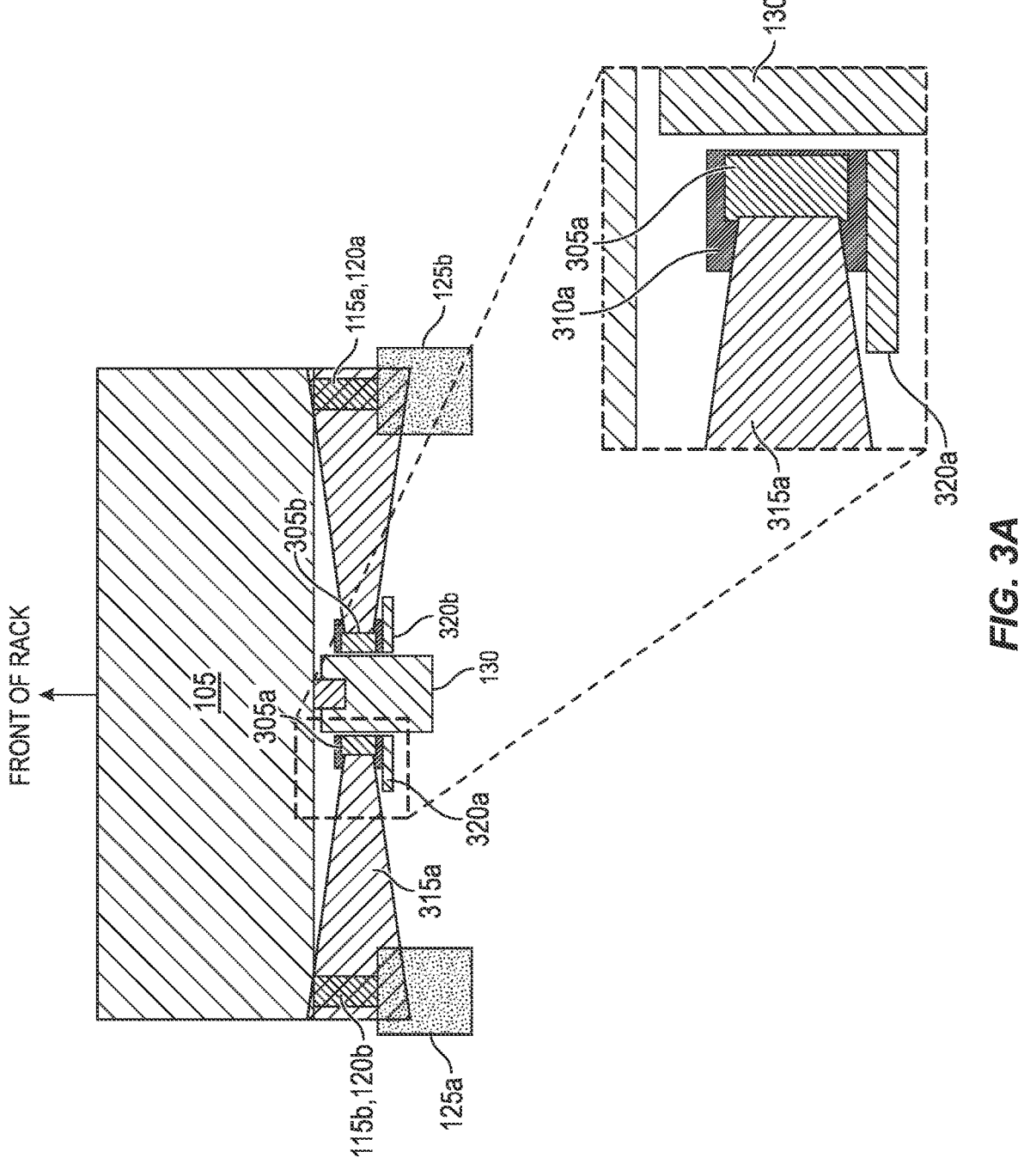
FIG. 3A is a top-view cutaway illustration of two busbar-attached leak detection bars, according to embodiments, and a magnified cutaway illustration of one of the leak detection bars.
Figure 3B:
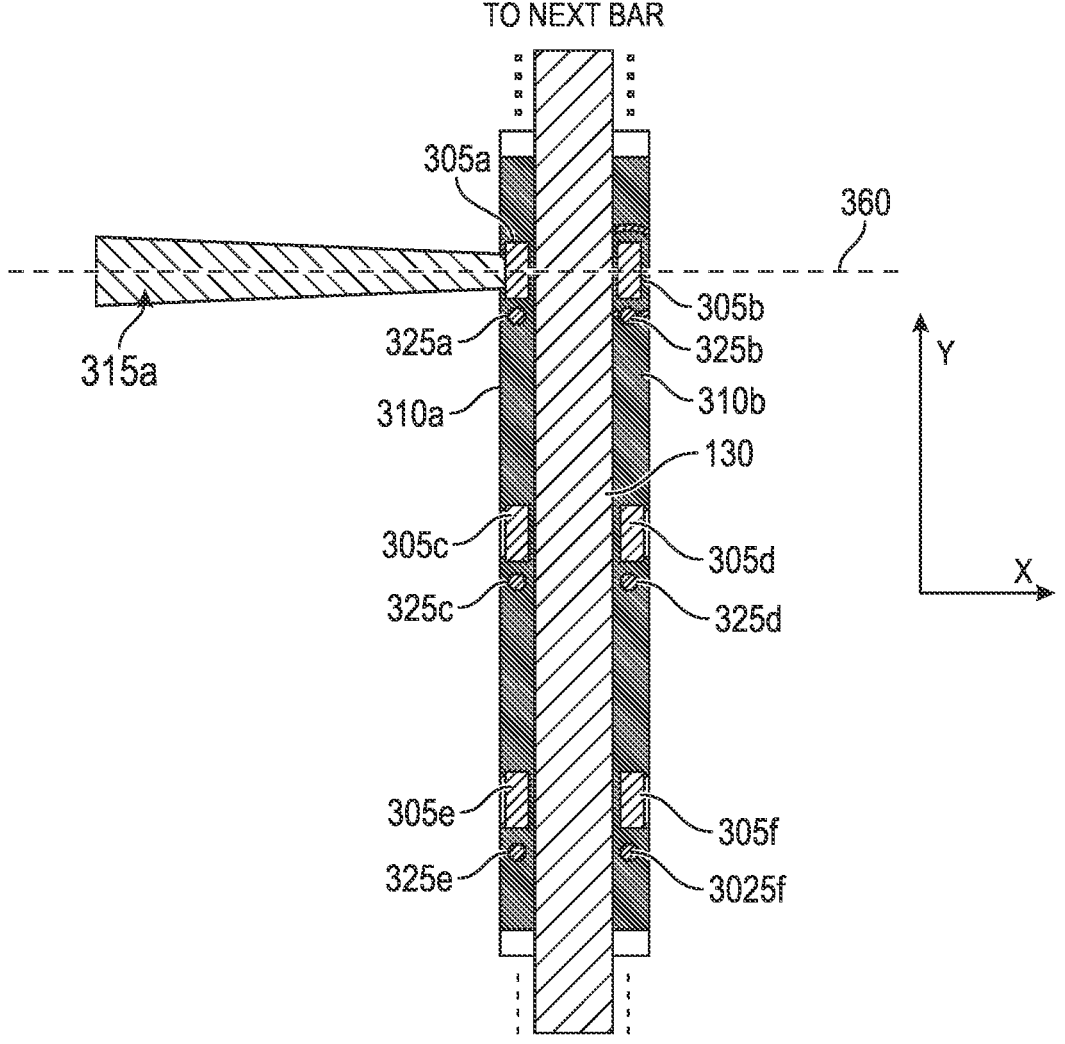
FIG. 3B is an illustration of a segment of a busbar and two busbar-attached leak detection bars.

FIG. 3A is a top-view cutaway illustration of two busbar-attached leak detection bars 310*a-b*, according to embodiments, and a magnified cutaway illustration of one of the leak detection bars 310*a*. FIG. 3B is an rear-facing illustration of a segment of a busbar 130 and two busbar-attached leak detection bars 310*a-b*. As indicated in rear-facing FIG. 3B, leak detection bars 310*a-b* are attached, respectively, to each side of the busbar 130 that extends vertically along the height of a rack. FIG. 3B depicts a segment of busbar 130 and a segment of a leak detection bar 310*a* that is attached to one side of the busbar and another segment of a leak detection bar 310*a* that is attached to the other side of the busbar. Although illustrated as a segment, in some embodiments, the busbar 130 may be a single unitary component that extends from the top cover 245 to the base 250 of the rack 110. Each of the leak detection bars 310*a-b* may be a single unity component, or may instead be composed of a series of connected segments. Each segment of a leak detection bar 310*a-b* may include multiple leak detection sensors 305a-f that are distributed along the vertical height of the busbar 130 to which each of the leak detection bars is attached.

As described above, a server IHS 105 may be coupled to liquid cooling manifolds 125a-b provided by a computing rack 110 through an administrator pushing the server into one or more slots supported by the rack. In some instances, the force applied by the administrator both inserts the server IHS 105 into the slots and mates quick-connect couplings 115a-b, 120a-b of the IHS and of the liquid cooling manifolds 125a-b. In such scenarios, the connections between couplings 115a-b, 120a-b are made blindly by the administrator, such than any misalignment or other abnormalities of the couplings cannot be observed. As such, liquid coolant leaks may arise at these couplings.

Leak detection systems operate at various locations within a liquid cooling system, yet this interface between the server IHS 105 and the liquid cooling manifolds 125a-b remains the most challenging location for leak detection. Leak detection within the server IHS 105 itself may be implemented by the manufacturer of the IHS. As such, the server IHS 105 may be customized as needed by the manufacturer to implement any leak detection that is needed within the IHS itself. The manufacturer(s) of the rack 110 and/or liquid cooling manifolds 125a-b are likewise limited in implementing leak detection at couplings 115a-b, 120a-b by which IHSs or other hardware are attached to the liquid cooling system. As described in further detail below, variances in the sizes and geometries of hardware that may be installed in the slots of a rack 110 further complicate leak detection at these particular couplings 115a-b, 120a-b.

As illustrated in the cutaway illustration of FIG. 3A, in embodiments, leak detection bars 310a-b are mounted on each side of the busbar 130, such that the leak detection sensors 305a-b are directed at the couplings 115a-b, 120a-b that connect the liquid cooling system of the server IHS 105 and the liquid cooling manifolds 125a-b. In particular, the leak detection sensor 305a that is fixed to leak detection bar 310a has a field of view 315a that includes couplings 115b, 120b. And, the leak detection sensor 305b that is mounted on leak detection bar 310b has a field of view 315b that includes couplings 115a, 120a. Accordingly, positioned in this manner, leak detection sensors 305a-b are able to detect leaks that are otherwise outside the control of all of the hardware components involved in the liquid cooling system.

In the magnified view of leak detection bar 310a included in FIG. 3A, the a cross-section of the leak detection sensors 305a is within a cavity or inner channel of a frame from which the leak detection bar 310a may be constructed. As illustrated in FIG. 3B, in some embodiments, the frame of the leak detection bar 310a may include openings at various locations along its length, with each of these openings in the frame of the leak detection bar 310a supporting a leak detection sensors 305a-f. In some embodiments, each of the leak detection sensors 305a-f may be optical leak sensors that emit light at specific frequencies that illuminate the liquid coolant that is being used in this liquid cooling system. Optical leak sensors may be tuned to operate with great sensitivity in detecting any such illuminations of leaking coolant. As such, the leaking of any amount of this liquid coolant may be illuminated and detected by the leak detection sensors 305a-f that are included in the leak detection bars 310a-b.

The cutaway illustration of FIG. 3A illustrates a cross section of the busbar 130 and leak detection bars 310a-b taken at axis 360 illustrated in FIG. 3B. As indicated in the cross-section of FIG. 3A, leak detection sensors 305a-b are installed within a cavity or inner channel of the frame from which each of the leak detection bars 310a-b may be constructed. As such, the field of view 315a-b of each of the leak detection sensors 305a-b may be defined in part by the size and/or shape of the openings in the frame of the leak detection bar. In some embodiments, the openings in the frame of the leak detection bars 310a-b may be selected to restrict the field of view 315a-b of each of the leak detection sensors 305a-f to the area of couplings 115a-b, 120a-b. By restricting the field of view of these leak detection sensors 305a-b in this manner, ambient light reaching the sensors 305a-f is reduced, while maximizing available sensor capabilities while avoiding false positives.

In some embodiments, leak detection sensors 305a-f may be further shielded by shades 320a-b that may be installed on the rear facing side of each of the leak detection bars 310a-b. Through the use of shades 320a-b, ambient light that reaches leak detection sensors 305a-b is further reduced. As illustrated, shades 320a-b extend beyond the leak detection bars 310a-b in covering a portion of the space between the sensors 305a-b and the liquid cooling manifolds 125a-b. In various embodiments, the shape and size of shades 320a-b may vary, with various portions of the space between the leak detection bars 310a-b and the couplings 115a-b, 120a-b being covered by the shade.

In some embodiments, the shades used along various sections of a leak detection bar 310a-b may differ to account for different sizes of IHSs or other hardware installed in an area of the rack 110. In some embodiments, the shades 320a used by one of the leak detection bars 310a may differ from the shades 320b used by the other leak detection bar 310b, such as to account for asymmetrical arrangements of intake and exhaust cooling lines, or of other structures of the rack 110 or of the IHSs installed in the rack. In some embodiments, some or all of the shades 320a-b may reach the entire length between the leak detection bars 310a-b and the couplings 115a-b, 120a-b, thus shrouding the entire field of view 315a-b of sensors 305a-f from ambient light. Using such shrouds, ambient light reaching leak detection sensors 305a-f may be mostly eliminated, thus improving the accuracy of the sensors and supporting maximized sensitivity settings by these sensors without resulting in false positives.

In this manner, the leak detection sensors 305a-f may be positioned and shielded in a manner that eliminates ambient light and that directs the field of view of the sensors towards the couplings 115a-b, 120a-b between the server IHS 105 and the liquid cooling manifolds 125a-b. As indicated in FIG. 3B, the leak detection bars 310a-b may be constructed from multiple segments, where the segments may be identical, or the segments may have varying capabilities with regard to the number and placement of sensors.

The illustrated segments of the leak detection bars 310a-b each include three of the leak detection sensors 305a-f. The segment of leak detection bar 310a includes leak detection sensors 305a, c, e and the segment of leak detection bar 310b includes leak detection sensors 305b, d, f. Each of the segments of the leak detection bars 310a-b may include electrical connectors that support daisy-chaining of the segments to extend the leak detection bars 310a-b along full length of the busbar 130, and thus the height of the rack 110. In some embodiments, the bottom segment may interface with a connector or cable that connects the sensors 305a-f in each of the respective leak detection bars 310a-b to a system used in management of the liquid cooling system. This connector may allow management of each of the sensors 305a-f in a leak detection bar 310a-b through use of a singe serial connection, such as an 12C bus, that is established between all of the sensors in each of the bars. In some embodiments, the bottom segment may be augmented with additional leak detection capabilities, such as leak detection ropes or sensors positioned beneath the rack.

Through the use of connectors that support linking of segments, each of the leak detection bars 310a-b may be constructed from multiple segments. Through selection of available segments, the leak detection sensors 305a-f may be positioned along the length of the liquid cooling manifolds 125a-b, where the selected vertical positions of the sensors are selected to correspond to the locations of couplings 115a-b, 120a-b. In some embodiments, the leak detection bars 310a-b may include leak detection sensors 305a-f at each slot position of the rack 110, such that the vertical distance between each row of leak detection sensors may be 1RU. For instance, leak detection sensor 305a and leak detection sensors 305c may be 1RU apart. In various embodiments, the leak detection sensors 305a-f may be spaced vertically by one or more RUs. When spaced by 2RUs, each of the leak detection sensors may be have a vertical (y-axis) field of view 315a-b that spans multiple RUs. In this manner, sensors 305a-f positioned may be selected that provided overlapping fields of view throughout the area of couplings 115a-b, 120a-b.

As indicated in FIG. 3B, leak detection bars 310a-b may include indicator lights 325a-f that are located along the length of each segment. The indicator lights may be installed on or within the frame of the leak detection bars 310a-b and are directed outwards towards the rear of the rack 110. Through illumination of these indicator lights 325a-f, administrators are directed to the specific area where leak detection sensors 305a-f have detected the presence of coolant. In some embodiments, each of the leak detection sensors 305a-f may have their own dedicated indicator light 325a-f that provides signals status information for a single sensor. In some embodiments, individual indicator lights 325a-f may be provided multiple sensors, such as in the embodiment of FIG. 5, or for segments of the leak detection bars 310a-b. In some embodiments, the indicator lights 325a-f may be illuminated (e.g., in green) to indicate the an individual leak detection sensor 305a-f is functioning normally. The color of indicator lights 325a-f may be changed to a different color (e.g., red, yellow) to indicate that a possible coolant has been detected. As described in additional detail below, in some embodiments, the indicator lights 325a-f may be illuminated a different color (e.g., blue) to indicate a configuration or positioning status of the sensor. In some embodiments, illumination of indicator lights 325a-f is also communicated via the daisy chain of segments to liquid cooling management system, which may generate various alarms and notification in response.

Figure 4:
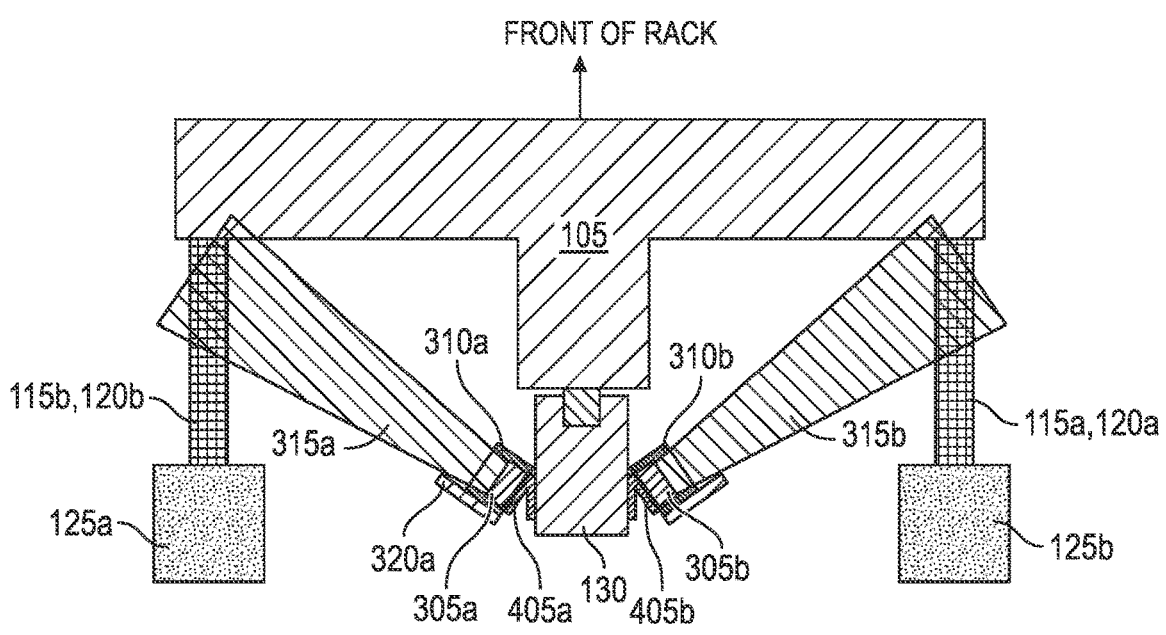
FIG. 4 is a top-view cutaway illustration of two pivoting busbar-attached leak detection bars, according to embodiments.

Leak detection bars 310a-b may be fixed to the busbar 130 in a variety of manners. In some embodiments, the leak detection bars 310a-b may be fastened to the outer enclosure of the busbar 130 via screws or bolts that are received in threaded holes in the outer enclosure of the busbar. In some embodiments, hooks of the leak detection bars 310a-b may by supported by corresponding openings in the frame of the busbar 130 by which the leak detection bars may be hanged on the busbar. As illustrated in FIG. 4, in some embodiments, one or both of the leak detection bars 305a-b may be attached to the busbar 130 via a hinge or other mechanism that allows each of the leak detection bars 310a-b to be rotated relative to the busbar, and relative to couplings 115a-b, 120a-b. FIG. 4 is a top-view cutaway illustration of two pivoting busbar-attached leak detection bars 310a-b, according to embodiments, that may be rotated away from the busbar 130 to adjust the field of view of each of the leak detection bars.

As described above, a variety of hardware may be installed with rack 110, where some or all of the hardware may utilize the liquid cooling system supported by the rack. As illustrated, a server IHS 105 may be installed within a rack 110, where the server occupies the entire volume, or nearly the entire volume, of the slot in which the server is installed. However, smaller sized server IHSs or other types of IHSs may also be inserted within slots of the rack. In some scenarios, various liquid-cooled networking equipment, such as one or more network switches, and/or power supplies may be installed in slots of the IHS, but these other types of hardware may be smaller in physical size than a 1RU server IHS 105. Due to the smaller size of such hardware installed in rack 100, as illustrated in FIG. 4, the couplings 115a-b, 120a-b that connect this hardware to the liquid cooling manifolds 125a-b may be deeper within the rack 110 than the quick-connect couplings used to connect sever IHS 105 to the liquid cooling manifolds.

In order to support detection of leaks at various different locations of the couplings 115a-b, 120a-b within rack 110, in embodiments, each of the leak detection bars 310a-b may be separately rotated about hinges 405a-b that are used to attach the leak detection bars to the busbar 130. Through such rotation of the leak detection bars 310a-b, the field of view 315a-b of each of the leak detection sensors 305a-b may be directed towards these couplings, or towards any other area of interest within the rack 110. In some embodiments, each of the leak detection bars 310a-b may be connected to the busbar 130 via hinges 405a-b that allows the respective leak detection bars to be rotated in this manner. In some embodiments, hinges 405a-b may be door-type butt hinges that are fastened using screws to the busbar 130 and to a leak detection bar 310a-b. Embodiments may utilize various other types of hinges or mechanisms that allow rotation of the leak detection bars 310a-b in the illustrated manner.

In some embodiments, these hinges may include multiple detents that define stable angles of rotation for the hinges at which the leak detection bars 310a-b can be positioned, with the detents prevent any movement of the leak detection bars from the angle at which they have been positioned. In this manner, embodiments support setting the field of view 315a-b for leak detection sensors 305a-b to any coupling locations within the rack 110, or other locations within the rack that are selected by an administrator. In some embodiments, the described indicator lights 325a-f may be illuminated when positioning the leak detection bars 310a-b using hinges 405a-b. For instance, the indicator lights 325a-f may illuminate (e.g., in blue) to indicate that a leak detection bar 310a-b has been rotated to a stable detent position supported by the hinges 405a-b. If the leak detection bars 310a-b are rotated and left in a non-stable position that does not correspond to any of the hinge 405a-b detents, the indicator lights 325a-f may illuminate a warning signal (e.g. flashing yellow) to warn the administrator of the unstable positioning of a leak detection bar 310a-b.

Figure 5:
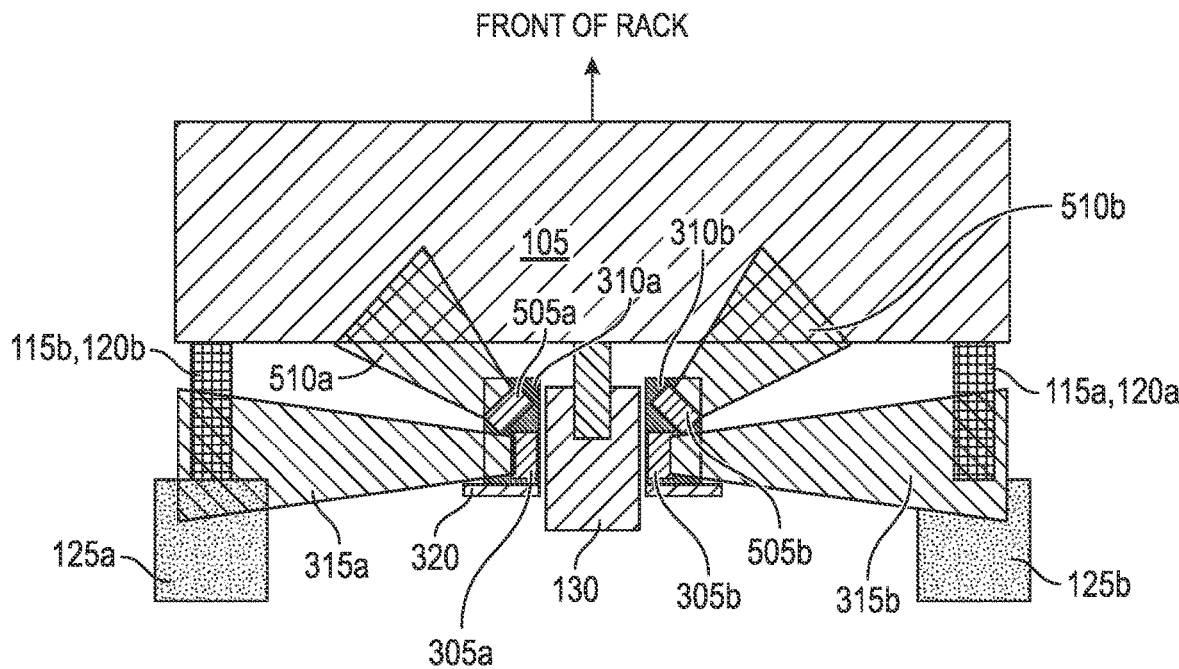
FIG. 5 is a top-view cutaway illustration of two busbar-attached leak detection bars that each include multiple leak detection sensors, according to embodiments.

Through the use of embodiments of FIG. 4, the leak detection sensors 305a-b may be directed towards locations within the rack 110 that may include the location of couplings 115a-b, 120a-b, or any other locations along the back of the server IHS 105, such as locations of suspected liquid coolant leaks. In FIG. 5, embodiments support multiple leak detection sensors at each vertical location of the leak detection bars 310a-b, thus supporting multiple fields of view.

FIG. 5 is a top-view cutaway illustration of two busbar-attached leak detection bars 310a-b that each include multiple leak detection sensors, according to embodiments. As illustrated in FIG. 5, leak detection bar 310a includes two leak detection sensors 305a, 505a that have distinct fields of view. In particular, leak detection sensor 305a is positioned to have a field of view 315a that is directed at the couplings 115b, 120b that connect the server IHS 105 to the liquid cooling manifold 125a.

As described, these couplings 115a-b, 120a-b may be the most vulnerable portion of the liquid cooling system with respect to possible coolant leaks. However, leaks may arise in other portions of the cooling system, including within the IHS or other hardware that is installed in the rack 110. Accordingly, leak detection bar 310a also includes leak detection sensor 505a that is positioned with a field of view 510a that is directed at a portion of the rear of the server IHS 105, such as the position of vents or other openings through which coolant leaks may be identified. In this same manner, leak detection bar 310b includes leak detection sensor 505b that is positioned with a field of view 510b that is directed at different portion of the rear of the server IHS 105. In some embodiments, sensors 505a, 505b may be positioned to have non-symmetrical fields of view. For instance, in FIG. 5, both sensors 505a, 505b are positioned at relatively the same angle with respect to the server IHS 105, thus supporting symmetrical fields of view 510a-b, but different angles may be selected for the positioning of 505a, 505b in order to account for different physical features (e.g., vents or other openings) and thus different leak detection opportunities at different locations along the rear of the server IHS 105.

Through such embodiments, leak detection capabilities may be expanded from the couplings 115a-b, 120a-b to also include leak detection at other locations on the rear of an IHS, or other hardware component installed in a rack 110. Via embodiments, leak detection bars 310a-b may be utilized in identifying leaks in inaccessible locations at the rear of an IHS installed in a rack 110 and at various locations internal to the rack that are within the field of view of any of the leak detection sensors that are supported by the leak detection bars. Embodiments thus support rapid identification of coolant leaks, including minor leaks that do not noticeably affect the pressure of the liquid cooling system or of the volume of liquid coolant in the system. In embodiments, leak detection sensors may detect single droplets of liquid coolant that form on couplings 115a-b, 120a-b, or that may emerge from any of the openings in the rear of an IHS or other hardware installed in the rack.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for liquid cooling of an IHS (Information Handling System) installed in a computing rack, the system comprising:
   a first liquid cooling manifold;
   a first liquid cooling coupling connecting the IHS to the first liquid cooling manifold;
   a busbar coupled to the IHS, wherein the busbar provides power to the IHS; and
   a first leak detection bar attached to the busbar and comprising a plurality of optical leak detection sensors directed at the first liquid cooling coupling connecting the IHS to the first liquid cooling manifold.

2. The system of claim 1, wherein the busbar extends along a height of the computing rack and provides power to additional IHSs installed in the computing rack.

3. The system of claim 2, wherein the first liquid cooling manifold comprises an intake manifold that extends along the height of the computing rack.

4. The system of claim 3, further comprising a second liquid cooling manifold comprises an exhaust manifold that extends along the height of the computing rack.

5. The system of claim 4, further comprising a second leak detection bar attached to the busbar and comprising a plurality of optical leak detection sensors directed at a second liquid cooling coupling connecting the IHS to the second liquid cooling manifold.

6. The system of claim 1, wherein the first leak detection bar comprises a shade that blocks ambient light from reaching the plurality of leak detection sensors.

7. The system of claim 1, wherein the first leak detection bar is attached to the busbar via one or more hinges that allow rotation of the first leak detection bar.

8. The system of claim 7, wherein rotation of the first leak detection bar using the hinges redirects the plurality of optical leak detection sensors to a rear portion of the IHS.

9. The system of claim 8, wherein rotation of the first leak detection bar redirects the plurality of optical leak detection sensors to a third liquid cooling coupling connecting a second IHS to the first liquid cooling manifold.

10. The system of claim 9, wherein the second IHS is smaller than the first IHS such that the third liquid cooling coupling extends further from the first liquid cooling manifold than the first liquid cooling coupling of the first IHS.

11. The system of claim 7, wherein the one or more hinges comprise detents corresponding to predefined angles of rotation of the hinges.

12. The system of claim 1, wherein the first leak detection bar comprises a plurality of lights indicating a leak detected by one or more of the optical leak detection sensors.

13. A computing rack comprising a plurality of slots for installation of Information Handling Systems (IHSs), the rack comprising:

a first liquid cooling manifold extending a height of the rack;

a busbar extending the height of the rack, wherein the busbar provides power to the IHS installed in the rack; and a first leak detection bar attached to the busbar and comprising a plurality of optical leak detection sensors directed at liquid cooling couplings connecting the IHS to the first liquid cooling manifold.

14. The computing rack of claim 13, wherein the first leak detection bar comprises a shade that blocks ambient light from reaching the plurality of optical leak detection sensors.

15. The computing rack of claim 13, wherein the first leak detection bar is attached to the busbar via one or more hinges that allow rotation of the first leak detection bar.

16. A leak detection bar for detecting liquid cooling leaks within a computing rack housing a plurality of Information Handling Systems (IHSs), the leak detection bar comprising:

a plurality of optical leak detection sensors directed at liquid cooling couplings connecting the IHSs to a first liquid cooling manifold that is attached to the computing rack, wherein the optical leak detection sensors are located along a length of a frame of the leak detection bar; and the frame is attached to a busbar that provides power to the IHSs installed in the rack, wherein the busbar extends a height of the computing rack.

17. The leak detection bar of claim 16, further comprising a shade that blocks ambient light from reaching the plurality of leak detection sensors.

18. The leak detection bar of claim 16, further comprising a plurality of lights indicating a leak detected by one or more of the leak detection sensors.

\* \* \* \* \*